Figures 1, 2:
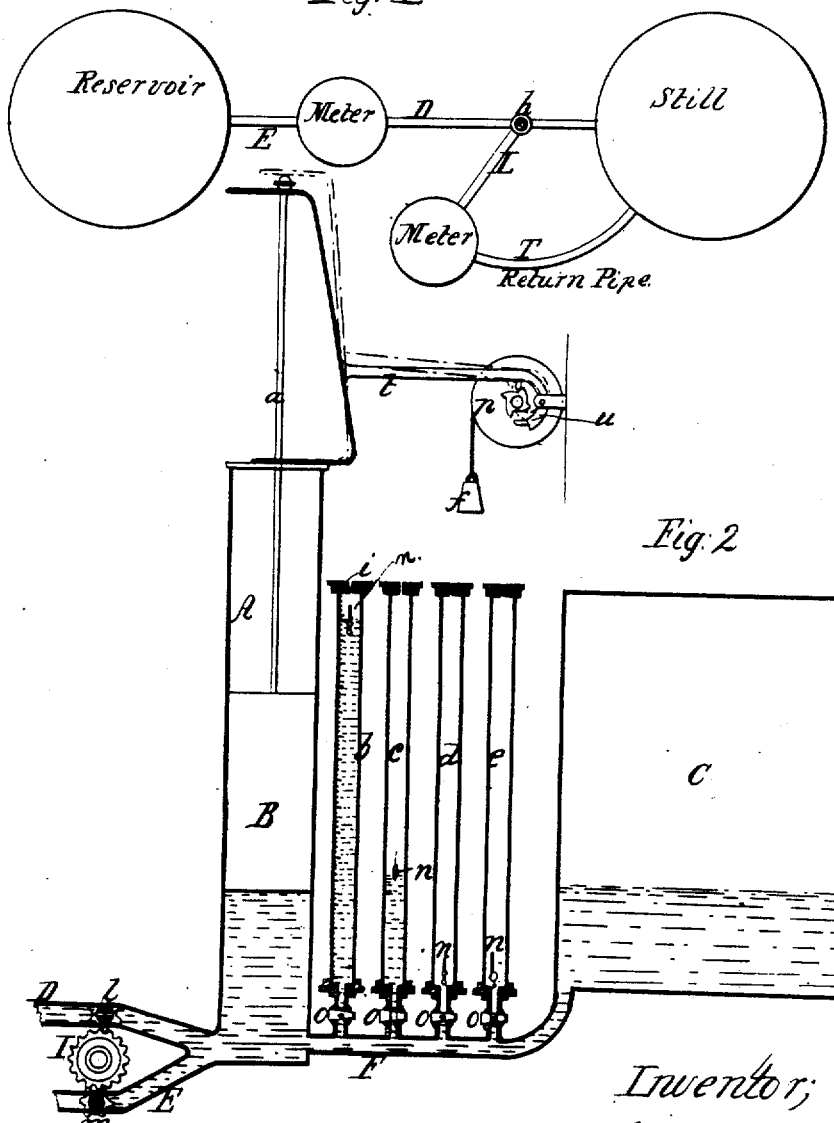

J. G. Allen.

Spirit Meter.

No. 2,657. Reissued June 25, 1867.

Witnesses;
Geo. H. Graebel
P. J. Dodge

Inventor;
J. G. Allen
by Dodge & Munn
attorneys

H. PETERS, PHOTO-LITHOGRAPHER, WASHINGTON, D. C.

BEST AVAILABLE COPY

United States Patent Office.

JOSHUA G. ALLEN, OF PHILADELPHIA, PENNSYLVANIA.

*Letters Patent No.* 63,452, *dated April* 2, 1867; *reissue No.* 2,657, *dated June* 25, 1867.

IMPROVED SPIRIT-METER.

The Schedule referred to in these Letters Patent and making part of the same.

TO ALL WHOM IT MAY CONCERN:

Be it known that I, J. G. ALLEN, of Philadelphia city and county, and State of Pennsylvania, have invented certain new and useful improvements in Spirit-Meters; and I do hereby declare that the following is a full, clear, and exact description thereof, reference being had to the accompanying drawings, making part of this specification, and to the letters of reference marked thereon.

To enable others skilled in the art to construct and use my invention, I will proceed to describe it.

My invention has for its object the measuring of liquids as they flow from a still, and registering the quantity, and at the same time preserving a sample of each separate quantity measured in such a manner that it can be examined at any time and still cannot be touched or tampered with by those examining it. Also in using separate meters in connection with a still in such a manner that the different grades flowing from the still shall flow through separate meters, independent of each other, samples being retained in one or both cases, as desired. It also consists in constructing the cocks and other parts of the meter of glass or other non-oxidizable material.

Figure 1 represents a plan view of my meters as arranged for use in connection with a still; and Figure 2 represents a front elevation of my improved meter.

My improved apparatus consists of a tubular reservoir, A, having a float, B, placed therein, and connected by a pipe, F, with a measuring-reservoir, C, of any desired size and form. Connected to this pipe F is a series of glass tubes, *b*, *c*, *d*, *e*, &c., having graduations marked thereon indicating inches and fractions of inches, and having a stop-cock at their lower ends by which the communication between them and the pipe F may be opened or closed, as desired. Within each of the tubes *b*, *c*, &c., is placed a hydrometer, with a thermometer attached, for indicating the strength and temperature of the liquid that may enter said tube, the same being indicated by *a* of fig. 1. A minute perforation, *i*, is formed in the cap, or near the top of each of the sample-tubes, so as to permit the air to pass in and out, so that said tubes may fill and empty without obstruction. D represents the pipe leading from the still, through which the liquor flows into the meter, it being provided with a stop-cock, *l*, to shut off the flow, when the meter is full, and it is to be emptied. Another pipe, E, leads from the meter to a reservoir into which the liquor is emptied after passing through the meter. This pipe E is also provided with a cock, *m*, this and the cock *l* being so arranged that as one closes the other will open, and *vice versa*. This movement of the two cocks may be effected by a cog-wheel, I, as shown in fig. 1, said wheel being actuated by suitable mechanism, or a two-way cock may be located at the junction of the two pipes D and E and made to close and open them alternately. The cocks *o* at the base of the sample-tubes will also be operated by mechanism in such a manner that they will be opened one at a time in regular succession, each being closed simultaneously with the opening of the one next succeeding it, and remaining closed until the entire series shall have been filled. When the last one of the series shall be filled the first one will be opened and the tube emptied, and in this way all the tubes but one will be kept filled, they being filled and emptied in regular succession. It is proposed to have thirty or more of these sample-tubes, one of which will be filled at each filling of the reservoir C, and the sample therein will thus be retained until the reservoir shall have been filled and emptied thirty times. As these samples are thus retained in the glass tubes in plain sight at all times, it is obvious that an inspector or other person can at any time examine them and by the graduations on the tube tell the height in inches, and at the same time, by means of the hydrometer and thermometer floating in the tube, can tell the density or strength and also the temperature of the samples. A weight, *f*, acting upon a wheel, *p*, on a shaft having an escape-wheel, *u*, attached, gives motion to the mechanism that operates the cocks, the escape-wheel being released by the rising of the float B in the cistern A, and again when the float reaches the bottom of the cistern as the meter is emptied. Motion may be imparted from the weight to the cocks *l*, *m*, and *o* by any suitable train of gearing or other suitable mechanism, which may be arranged in a variety of well-known ways, the only requisite being that said cocks shall be opened and closed at the proper intervals. In order to protect the cocks, pipes, and other internal portions of the meter from injury by acids which may be formed in the liquor, or which may by any means get into it, I propose to construct them or line them with glass, vulcanized rubber, gutta percha, or other suitable material.

The operation of the apparatus is as follows: A pipe leading from the still will be divided into two branches, and L, with a two-way cock, *h*, at the junction, so that the product of the still may be made to flow through pipe D to a meter, and from thence by pipe E into the receiving-reservoir, which it will be permitted to do so long as it is of proper strength to be classed as "proof;" but when it becomes reduced below "proof," or 20°, the cock *h* is then turned and the liquor made to flow through pipe L to a separate meter, which may be provided with sample-tubes or not, as desired, from whence it will be returned by means of a pump through pipe T to the still. As the liquor flows through pipe D into the meter it will rise in the cistern A and in the sample-tube which happens to have its cock open, and also in the measuring-reservoir C, simultaneously; and this it will continue to do until the float B shall rise far enough to release the escape-wheel *u*, which will permit the weight to operate the mechanism long enough to close the cock *l* and also the cock *o* at the mouth of the sample-tube just filled, at the same instant opening the cock *m*, and permitting the contents of the reservoir C and the cistern A to flow out through the outlet pipe E into the receiving-reservoir. As soon as the cistern is empty, and the float arrives at the bottom, the mechanism is again moved by another tooth of the escape-wheel being released and the cock *m* closed and *l* opened, the cock of the succeeding sample-tube being opened at the same time. When this is down the liquor flows in and fills the cistern and reservoir, together with another sample-tube, as before; and thus the operation is continued automatically so long as liquor flows from the still into the meter. As the liquid will stand at a uniform height in the reservoir and the tube that is filled at the same time, it is obvious that by knowing the area of the reservoir the amount which enters it each time may be accurately determined by the height that the liquid stands in the sample-tube, and as the contents of these sample-tubes are constantly in plain sight, and cannot be touched or in any manner tampered with, it is evident that the record thus made must be reliable, and thus prevent fraud. If desired, a registering apparatus may also be connected with the operating mechanism in such a manner as to register either the number of times the reservoir is filled, or the number of gallons, or both.

The great advantage of my apparatus is that samples are retained separately for a long time where they can be examined successively by any number of persons, each independent of the other, each thus becoming a check upon the others, and at the same time the samples being so preserved as to be beyond the reach of all, thus rendering it impossible for either the proprietor, the officers, or any one else to tamper with or in any way change or affect them, thus affording a means of protection not furnished by any other system of meters. As an additional security, the series of sample-tubes will be enclosed in a glass case in such a manner as to cut off all access to them.

It is obvious that my apparatus may be used in connection with the distillation of petroleum and other liquids with equal advantage.

Having thus described my invention, what I claim, is—

1. A meter provided with a series of sample-tubes or chambers, arranged to receive and retain samples of the liquid measured, substantially as and for the purpose set forth.

2. I claim combining with a still two separate meters, so arranged that the high grade shall flow through one and the low grade through the other independently of each other, as set forth.

3. I claim constructing the meter, or such portions of it as may be necessary, of glass or other non-oxidizable material, to protect it from injury by acids.

4. I claim the use of a graduated tube, with a hydrometer placed therein for the purpose of indicating the height of the liquid, its quality or grade, and temperature, substantially as described.

J. G. ALLEN.

Witnesses:

W. C. DODGE,

H. B. MUNN.